(12) United States Patent
Oroskar

(10) Patent No.: US 8,996,074 B1
(45) Date of Patent: Mar. 31, 2015

(54) PAGING STRATEGY BASED ON PAGING SUCCESS RATE AND PAGING-CHANNEL OCCUPANCY

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 463 days.

(21) Appl. No.: 13/430,456

(22) Filed: Mar. 26, 2012

(51) Int. Cl.
  *H04M 1/00* (2006.01)
  *H04W 4/06* (2009.01)

(52) U.S. Cl.
  CPC .................................. *H04W 4/06* (2013.01)
  USPC ......................................... 455/567; 455/458

(58) Field of Classification Search
  USPC ................. 455/426.1, 458, 515, 567
  See application file for complete search history.

(56) References Cited

U.S. PATENT DOCUMENTS

| | | | |
|---|---|---|---|
| 5,369,681 A | 11/1994 | Boudreau et al. | |
| 6,181,945 B1 | 1/2001 | Lee | |
| 6,223,042 B1 | 4/2001 | Raffel | |
| 6,643,520 B1 | 11/2003 | Park et al. | |
| 6,745,039 B1 | 6/2004 | Di Lalla | |
| 6,922,561 B2 | 7/2005 | Chen et al. | |
| 6,963,750 B1 * | 11/2005 | Cheng et al. | 455/458 |
| 7,047,005 B2 | 5/2006 | Kinnavy | |
| 2006/0116124 A1 * | 6/2006 | Signore et al. | 455/435.1 |
| 2006/0251033 A1 | 11/2006 | Oprescu-Surcobe et al. | |
| 2007/0105535 A1 | 5/2007 | Jacobson et al. | |
| 2008/0032713 A1 | 2/2008 | Yang | |
| 2008/0096520 A1 | 4/2008 | Benco et al. | |
| 2008/0293437 A1 | 11/2008 | Ranganathan et al. | |
| 2009/0061854 A1 | 3/2009 | Gillot et al. | |
| 2009/0247137 A1 | 10/2009 | Awad | |

OTHER PUBLICATIONS

Unpublished U.S. Appl. No. 12/853,730, filed Aug. 10, 2010 entitled "Reducing the Usage of Non-Preferred Wireless Coverage Areas".
Unpublished U.S. Appl. No. 12/690,629, filed Jan. 20, 2010 entitled "Dynamic Paging Concatenation".
Unpublished U.S. Appl. No. 12/558,359, filed Sep. 11, 2009 entitled "Dynamic Paging Concatenation".
Unpublished U.S. Appl. No. 12/553,661, filed Sep. 3, 2009 entitled "Method and System for Paging a Mobile Station".
Unpublished U.S. Appl. No. 12/572,829, filed Oct. 2, 2009 entitled "Overflow Pages in Heavily Loaded Slots".
Unpublished U.S. Appl. No. 12/776,287, filed May 7, 2010 entitled "Dynamic Paging for Hybrid Mobile Stations".
Unpublished U.S. Appl. No. 12/786,174, filed May 24, 2010 entitled "Dynamic Paging Concatenation Based on Page-Type".

(Continued)

*Primary Examiner* — Tu X Nguyen

(57) ABSTRACT

Exemplary methods and systems may help to more intelligently provide adaptive paging. An exemplary method involves: (i) making a determination that a wireless communication device (WCD) should be paged, (ii) in response, selecting one or more coverage areas for an initial page attempt to the WCD, wherein the selected coverage areas are selected from recent-response list that indicates coverage areas via which a page response message was recently received from the WCD, and wherein selecting the coverage areas comprises, for each coverage area from the recent-response list, using both (a) a paging success rate for the coverage area and (b) a paging-channel occupancy of the coverage area as a basis for determining whether or not to select the coverage area for the initial page attempt, and (iii) initiating the initial page attempt to the WCD in the one or more selected coverage areas.

20 Claims, 7 Drawing Sheets

| | Sector | Count Parameter 304 | Paging Success Rate (%) 306 | Paging Channel Occupancy (%) 308 |
|---|---|---|---|---|
| 302a→ | A | 20 | 90 | 45 |
| 302b→ | B | 3 | 100 | 65 |
| 302c→ | C | 67 | 95 | 55 |
| 302d→ | D | 15 | 45 | 60 |
| 302e→ | E | 98 | 92 | 80 |
| 302f→ | F | 31 | 80 | 50 |

300

(56) References Cited

OTHER PUBLICATIONS

Unpublished U.S. Appl. No. 12/756,027, filed Apr. 7, 2010 entitled "Paging Power Control Based on Page Concatenation".

Unpublished U.S. Appl. No. 12/786,184, filed May 24, 2010 entitled "Dynamic Adjustment of Paging Power Based on Page-Type".

Unpublished U.S. Appl. No. 12/854,114, filed Aug. 10, 2010 entitled "Dynamic Paging Concatention Based on the Likelihood of Roaming".

Unpublished U.S. Appl. No. 12/261,229, filed Oct. 30, 2008 entitled "Method and System of Roaming".

Cai et al., "Mitigating DoS Attacks on the Paging Channel by Efficient Encoding in Page Messages," Computer Science Department, University of California, Davis, Sprint Advanced Technology Labs.

Unpublished U.S. Appl. No. 13/211,849, filed Aug. 17, 2011 entitled "Switch-Level Page Settings Based on a Combination of Device Performance and Coverage Area Performance".

* cited by examiner

PAGING STRATEGY BASED ON PAGING SUCCESS RATE AND PAGING-CHANNEL OCCUPANCY

BACKGROUND

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other wireless communication device (WCD) that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air interface protocols that define a mechanism for wireless exchange of information between the WCD and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), LTE, TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link, for example, may define (i) access channels on which WCDs may transmit "access probes" such as registration messages and call origination requests, and (ii) traffic channels on which WCDs may transmit bearer traffic for receipt by the RAN.

In a conventional CDMA wireless network compliant with the well-known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code.

When a RAN receives an incoming communication for a WCD, the RAN typically pages the WCD via a paging channel in at least the coverage area in which the WCD last registered. When a cellular wireless communication system seeks to page a WCD (e.g., for an incoming call or for some other reason), a switch in the network may send the page message to numerous base stations in the switch's coverage area, with the hope that when the base stations broadcast the page message, the WCD will receive the page message in one of the associated sectors, and will respond. Further, a switch may be configured to re-send a page in the event that a given attempt to page a WCD fails.

OVERVIEW

Exemplary methods may help a radio access network (RAN) to more effectively and/or efficiently page the wireless communication devices (WCDs) that it serves. In particular, an exemplary method may be employed in an adaptive paging scheme to help more intelligently select the coverage areas to include in an initial page attempt.

For instance, when a RAN seeks to page a given WCD, the RAN may select coverage areas from a list of coverage areas via which page response messages have been most-recently received from the WCD. This list of coverage areas may be referred to as the "recent-response list" for the given WCD. To select coverage areas for an initial page attempt, from the recent-response list, the RAN may consider both the WCD's respective paging success rates in the coverage areas and the current paging channel occupancies in the coverage areas.

More specifically, if there is a high historical paging success rate for a particular WCD in a particular coverage area this can mean that future pages in the coverage area are more likely to be successful than in other coverage areas where the paging success rate is lower. Further, if the paging channel occupancy is lower in a given coverage area, then this may indicate that a page is more likely to succeed in the given coverage area than in a coverage area with a higher paging channel occupancy. Thus, by considering both of these factors when selecting coverage areas for adaptive paging, a RAN may be able to increase the probability of successfully paging a WCD, as compared to an implementation where the RAN only considers the paging success rate, or only considers the paging channel occupancy.

In one aspect, an exemplary method involves a switch in a radio access network: (a) making a determination that a particular wireless communication device (WCD) should be paged; (b) responsive to the determination that the particular WCD should be paged, selecting one or more coverage areas for an initial page attempt to the particular WCD, wherein selecting the one or more coverage areas comprises: (i) determining a subset of the coverage areas from a recent-response list that includes coverage areas via which a page response message was recently received from the particular WCD, wherein each coverage area in the subset has a respective paging success rate that is greater than a threshold rate; and (ii) for each coverage area in the subset: (a) determining whether a respective paging-channel occupancy of the coverage area is less than a threshold occupancy and (b) removing the coverage area from the subset if the paging-channel occupancy of the coverage area is greater than the threshold occupancy; and (c) after removing any coverage areas having greater than the threshold occupancy, initiating the initial page attempt to the particular WCD in the subset of coverage areas.

In another aspect, an exemplary method involves a radio access network component: (i) making a determination that a particular wireless communication device (WCD) should be paged; (ii) in response to the determination that the particular WCD should be paged, selecting one or more coverage areas for an initial page attempt to the particular WCD, wherein the one or more selected coverage areas are selected from recent-response list that indicates coverage areas via which a page response message was recently received from the particular WCD, and wherein selecting the one or more coverage areas comprises, for each of one or more coverage areas from the recent-response list, using both (a) a paging success rate for the coverage area and (b) a paging-channel occupancy of the coverage area as a basis for determining whether or not to select the coverage area for the initial page attempt; and (iii) initiating the initial page attempt to the particular WCD in the one or more selected coverage areas.

In a further aspect, an exemplary system includes a non-transitory computer-readable medium and program instructions stored on the non-transitory computer-readable medium. The program instructions are executable by at least one processor to: (i) make a determination that a particular wireless communication device (WCD) should be paged; (ii) in response to the determination that the particular WCD should be paged, select one or more coverage areas for an initial page attempt to the particular WCD, wherein the one or more selected coverage areas are selected from a recent-response list that indicates coverage areas via which a page response message was recently received from the particular WCD, and wherein selecting the one or more coverage areas comprises, for each of one or more coverage areas from the recent-response list, using both (a) a paging success rate for the coverage area and (b) a paging-channel occupancy of the coverage area as a basis to determine whether or not to select the coverage area for the initial page attempt; and (iii) initiate the initial page attempt to the particular WCD in the one or more selected coverage areas.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

I. EXEMPLARY NETWORK ARCHITECTURE

Figure 1:
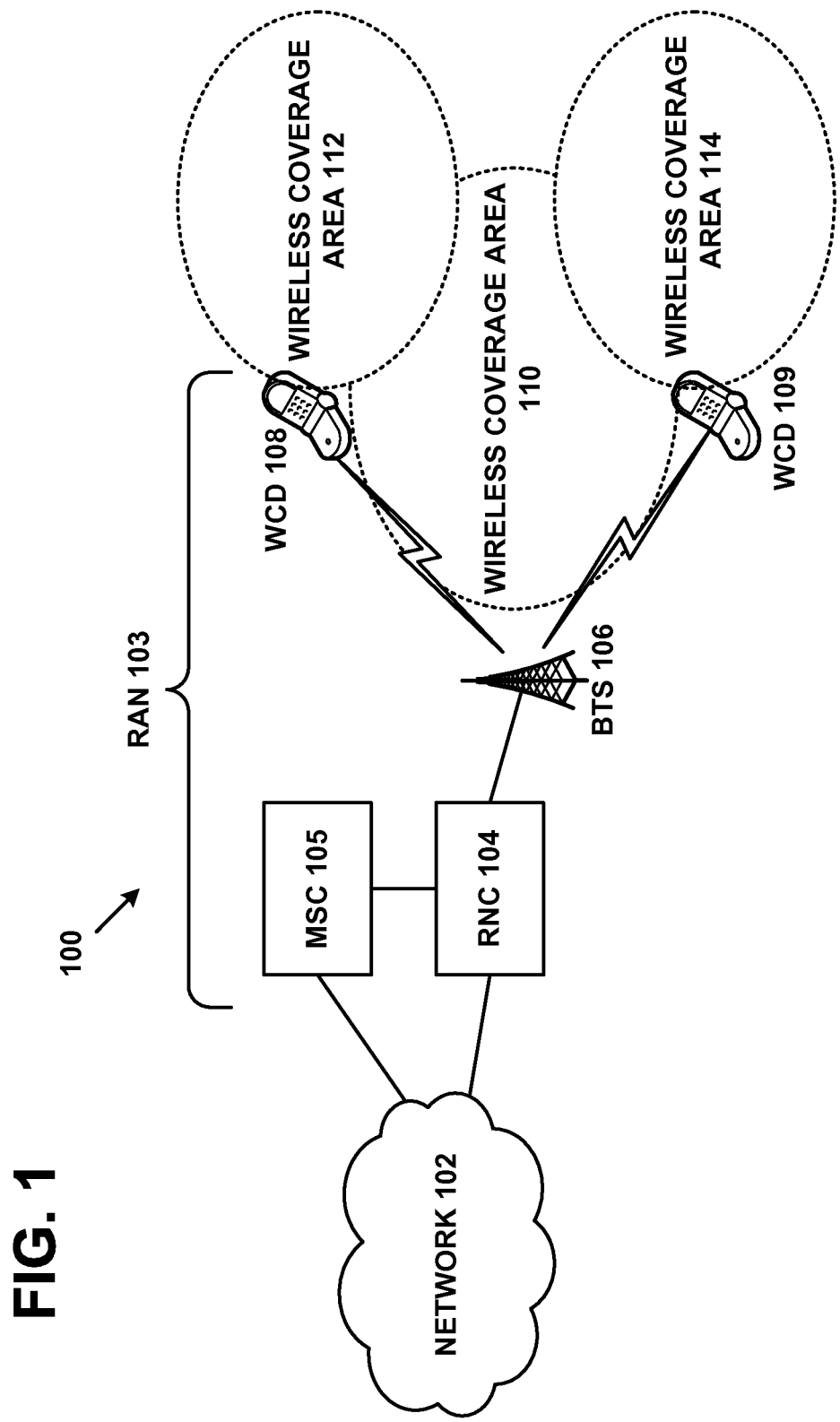
FIG. 1 depicts an exemplary communication system in which the embodiments herein can be carried out or deployed.

FIG. 1 depicts an exemplary communication system 100 in which the embodiments herein can be carried out or deployed. At a high level, communication system 100 comprises a network 102, a RAN 103, and wireless coverage areas 110, 112, and 114. Any of the wireless coverage areas may provide wireless communication services to WCD 108 and/or WCD 109.

Network 102 is preferably a packet-switched and/or circuit-switched communication network that links RAN 103 to other networks, devices, applications, and/or services. Network 102 may be, for instance, the Internet, a private IP network, the public-switched telephone network (PSTN) or a private circuit-switched network. Network 102 may comprise one or more switches, gateways, routers, signaling nodes, application servers, and/or other types of devices, systems and networks. In one possible embodiment, network 102 includes both packet-switching and circuit-switching capabilities.

RAN 103 may include a base station controller (BSC) 104, a mobile switching center (MSC) 105, a base transceiver station (BTS) 106, and other RAN components. However, for sake of simplicity, FIG. 1 excludes some of these components, such as softswitches, media gateways, media gateway controllers, signaling nodes, authentication servers, registration servers, and so on. Furthermore, throughout this description, the term "RAN component" may be used to refer to a BTS, a BSC, a combination of one or more BTSs and a BSC, or any other type of component used for RAN functionality.

BTS 106 may radiate on one or more frequencies to define wireless coverage area 110. Wireless coverage area 110, may, in turn, serve WCD 108 and/or WCD 109. To supply wireless service to these WCDs, as well as other WCDs, wireless coverage area 110 may include an air interface that comprises one or more forward link and/or reverse link channels. Through the forward and reverse link channels, BTS 106 and WCD 108 and/or WCD 109 may exchange signaling and bearer traffic.

In one possible embodiment, these channels may be formed via a set of orthogonal Code Division Multiple Access (CDMA) codes, each of which may be used to modulate the data transmitted on a particular channel. However, other embodiments using different technologies are also possible. These other technologies include, but are not limited to, Worldwide Interoperability for Microwave Access (WIMAX®), Universal Mobile Telecommunications System (UMTS®), Long Term Evolution (LTE®), IDEN®, or 802.11 (Wifi). Thus, RAN 103 may operate according to one or more of CDMA, any of these other technologies, and/or additional technologies now known or developed in the future.

The forward link channels, which carry data from BTS 106 to WCD 108 and from BTS 106 to WCD 109, may include a pilot channel, over which a phase offset pattern is repeatedly transmitted, a sync channel over which synchronization data, such as a timing reference, is transmitted, and traffic channels over which bearer traffic directed to WCD 108 and/or WCD 109 is transmitted. Additionally, one or more of the forward link channels may be designated as primary and/or secondary paging channels, and may be used for contacting WCDs.

The reverse link channels, which carry data from WCDs 108 and 109 to BTS 106, may also be formed through the use of CDMA or other technologies. These reverse link channels may include, for example, an access channel for responding to paging messages and for initiating communications, and reverse traffic channels for transmitting bearer traffic from WCD 108 to BTS 106 and from WCD 109 to BTS 106.

BSC 104 may perform a variety of tasks, including management of the wireless resources associated with BTS 106, and routing of traffic to and from BTS 106. Further, BSC 104 may be able to facilitate handoff of WCD 108 and/or WCD 109 from one wireless coverage area to another. BSC 104 may be communicatively coupled to network 102 either directly or via one or more links or other devices. For instance, BSC 104 may communicate with network 102 via MSC 105 or via an access gateway (not shown), such as a packet data serving node (PDSN) or an access serving network gateway (ASN-GW).

MSC 105 may perform many of the functions of a Class 5 telephony switch, but with additional functionality to manage the mobility of subscriber devices, such as WCD 108 and 109. For example, MSC 105 may comprise or be communicatively coupled with a visitor location register (VLR) and a home location register (HLR). MSC 105 may be responsible for switching functions, media transport functions, transcoding functions, short message service (SMS) functions, and managing the communications between WCDs and any of the circuit switched functions of network 102 or other networks.

Furthermore, MSC 105 may track subscriber usage to facilitate billing and performance monitoring. To do so, for each call that the MSC 105 handles, MSC 105 may generate a Call Detail Record (CDR). The CDR may take various forms but often includes certain information about the call, such as the originating number, terminating number, the sector or sectors in which the call occurred, start time, stop time, and/or call type (e.g., local or long-distance, voice or data, and so on). MSC 105 may transmit these CDRs to a central entity that maintains a database in which the CDRs are compiled. It should be understood that RAN components other than MSCs may generate CDRs in addition to or instead of MSC 105 generating CDRs.

WCD 108 and WCD 109 may be two of potentially many WCDs being provided service in wireless coverage area 110. Such WCDs could be a wireless telephone, a wireless personal digital assistant, a wirelessly equipped laptop computer, a wireless router, or another type of mobile or fixed wireless device. Preferably, a WCD is a subscriber device that is manipulated by a human in order to establish and engage in circuit-switched or packet-switched voice and/or data calls. However, a WCD could also be an automated device without a human interface.

A WCD may be associated with zero or more RANs at a time and may use the wireless coverage areas of these RANs to communicate, via network 102, with correspondent nodes, such as web servers, gaming servers, short message service (SMS) servers, signaling and media nodes, other WCDs, and other communication devices (e.g., wireline phones).

It should be understood that FIG. 1 is presented merely for purposes of example, and that communication network 100 may comprise more or fewer components in different arrangements than shown. Further, each of these devices, such as BSC 104, MSC 105, and BTS 106, may include multiple physical or logical components arranged to operate in conjunction with one another. Alternatively or additionally, these devices may be able to be combined with one another into a smaller number of logical or physical devices. In sum, changes may be made to the arrangement illustrated by FIG. 1 without departing from the scope of the invention.

II. PAGING FUNCTIONALITY

When a RAN seeks to communicate with a WCD (e.g., to establish an incoming voice call or transmit incoming packet data), the RAN may first page the WCD on a paging channel. The purpose of paging the WCD may be to determine whether the WCD is still within range of a wireless coverage area, and if so, to notify the WCD of the incoming communication. If the WCD is successfully paged, the RAN may assign one or more traffic channels to WCD.

Preferably, a paging channel comprises one or more of the forward links supported by the wireless coverage area. The paging channel may operate in a slotted manner, according to time-division multiplexing (TDM), and multiple WCDs may be grouped together and assigned to the same paging channel slot. Each paging channel slot is typically divided into four frames, each of which comprises two half-frames, resulting in a total of eight half-frames per paging channel slot. In a given paging channel slot, the RAN preferably transmits one or more general paging messages (GPMs), each containing information sufficient to identify which WCD or WCDs of the group (if any) are being paged. Thus, a WCD served by the wireless coverage area may periodically listen to its assigned paging channel slot to determine whether the RAN is seeking to page the WCD.

Paging is typically initiated when an MSC receives an indication that a WCD should be paged (e.g., an incoming call), or when the MSC itself determines that a WCD should be paged. The indication normally includes a WCD identifier, such as a Network Access Identifier (NAI), a Mobile Directory Number (MDN), a Mobile Identification Number (MIN), an International Mobile Subscriber Identifier (IMSI), an electronic serial number (ESN), and/or a mobile equipment identifier (MEID). The MSC may then transmit some representation of the indication to the appropriate BTS or BTSs. In turn, the BTS may use the WCD identifier to generate a page record, which the BTS may then place in a GPM for transmission to the WCD. (A GPM may also be referred to as a "page-request message" or just a "page.") The WCD may then reply to the BTS with a page-response message (PRM) sent via a reverse-link access channel. After receiving the PRM and verifying the page was successfully received, the RAN may then assign one or more traffic channels to the WCD.

A. Resending Pages and Zone-Based Paging

In a further aspect of paging, a RAN will typically resend a page (and possibly do so a number of times) when a page fails to reach (or seemingly fails to reach) a WCD. More specifically, when a RAN does not receive a page response message from a WCD, the switch in the serving system (e.g., MSC 105) preferably attempts to re-page the WCD. In particular, an MSC 105 may wait a predetermined period of time (ten seconds, for instance) to receive an indication from a base station, which indicates a page response message has been received. If the MSC 105 does not receive such an indication, the MSC will resend the page to the base station to again be transmitted to the WCD. The MSC typically repeats this process until a page response message indicates that the page was successfully received, or until a maximum number of attempts have been made without receiving a page response message, and the page is deemed to have failed.

In an exemplary embodiment, a switch may have various paging-scheme settings that affect the manner in which the switch resends a page. In particular, the switch may define a "maximum-attempt" parameter, the value of which indicates the maximum number of attempts that can be made to send a given page. Further, the switch may track the "paging-attempt status" of a given page; which may also be referred to as the switch's "attempt count" for the page (i.e., how many attempts have been made by the switch to send the page). For example, an MSC may include, maintain, or have access to a database that tracks the paging-attempt status of pages initiated by the MSC. As such, when a page is successfully received at the intended WCD, and a page response message is received at the base station from which the page was sent, this may be relayed to the switch. The switch then knows not to initiate additional attempts to send the page and refrains from sending pages out to the base station from making additional attempts to send out the page. On the other hand, if the switch does not receive an indication that the page was successful from any base station, the switch will check the paging-attempt status, and if appropriate, send the page to one or more base stations for transmission in their respective coverage areas.

In addition, the switch may implement a "page-attempt timer," which the switch uses to determine when to make a subsequent paging attempt. Accordingly, if additional attempts to send the page are possible after the switch makes an attempt to send the page (i.e., if the attempt count for the page is less than the maximum-attempt value after the switch sends an indication to one or more base stations to page the WCD), the switch starts the page-attempt timer. Then, if no acknowledgement has been received from the WCD when the page-attempt timer expires, the switch initiates the next attempt to send the page.

In a further aspect, given the scarcity of paging channel resources in most modern cellular networks, paging across multiple sectors is typically implemented with a more-targeted paging process that is commonly referred to as "zone-based paging." With zone-based paging, a cellular network is divided into paging zones, each with a respective zone ID, and paging is performed on a zone-basis. To facilitate this, each base station (e.g., BTS 106) in the system may broadcast as one of its overhead parameters the zone ID for the zone in which the base station is located. A WCD 108 operating in the network may then programmatically monitor the zone IDs indicated in the overhead messages and may automatically register with the network when they detect that they have moved into a new zone, or for other reasons. With this process, the registration records thereby maintained by switches and/or home location registers will indicate the paging zone in which each WCD last registered.

When a switch (e.g., MSC 105) seeks to page a WCD, the switch may then efficiently send the page message to just those base stations that are within the zone of the WCD's last registration, as it is likely that the WCD is in that zone. Further, the switch may send the page message to the base stations in zones adjacent to the WCD's zone of last registration, to cover the possibility that the WCD has moved to a new zone but has not yet registered its presence in the new zone.

Figure 2:
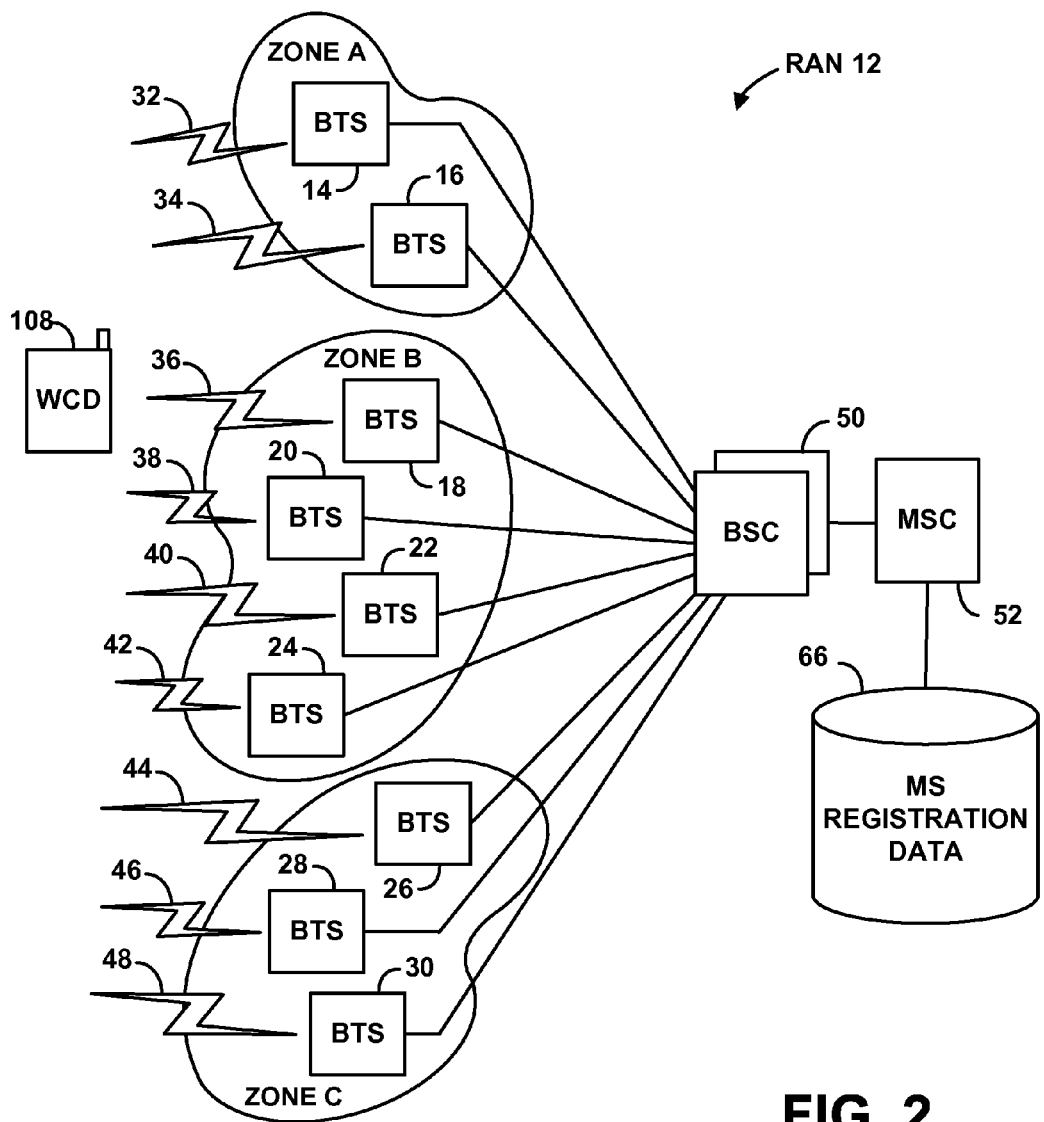
FIG. 2 is a block diagram illustrating a portion of a coverage area of a radio access network, which is divided into paging zones according to a zone-based paging scheme.

FIG. 2 is a block diagram illustrating a portion of a coverage area of radio access network 12, which is divided into paging zones according to a zone-based paging scheme. As shown, the base stations 14-30 are grouped into zones A, B, and C to facilitate zone-based paging as described above. In particular, each base station may broadcast a zone ID indicating its zone, and a WCD such as WCD 108 may monitor the zone IDs broadcast in the coverage areas where the WCD is operating. When the WCD detects a change in zone ID, the WCD may then responsively register its presence in the new zone, so that the RAN would then know to page the WCD in that new zone.

In an exemplary embodiment, zones are defined by MSCs (i.e., zone IDs are created, base stations are assigned to a particular zone ID, etc.). For instance, MSC 52 may create zone IDs corresponding to each zone A-C, and assign base stations 14-16 to zone A, base stations 18-24 to zone B, and base stations 26-30 to zone C. It should be understood, however, that other network entities may define paging zones, in combination with or instead of MSC 52, without departing from the scope of the invention.

As shown, MSC 52 also includes or has access to WCD registration data 66. The WCD registration data 66 preferably comprises data that specifies per WCD where the WCD is currently registered, such as the zone in which the WCD is currently registered, among possibly other information. In an exemplary embodiment, the WCD registration data may take the form of a visitor location register (VLR) database, which holds a record per WCD in the MSC's service area. The WCD's current zone of registration can thus be indicated in the WCD's VLR record. Alternatively or additionally, the WCD registration data can take the form of a home location register (HLR) database that is accessible via the MSC 52. Still alternatively, the data may be stored internally at the MSC and/or base stations, or elsewhere in some other form.

Using the general paging strategy that is implemented in many RANs providing IS-2000 and/or EVDO service, a RAN can make up to three attempts to page a WCD. In particular, the MSC 52 may initiate a first attempt by sending a page to one or more base stations for transmission in the paging zone B in which the WCD is registered (i.e., the base stations in the paging zone in which the WCD is registered transmit the page record). Then, if the first attempt is unsuccessful (e.g., the WCD does not acknowledge the page), the MSC initiates a second attempt by again sending the page record to the one or more base stations for transmission in the paging zone B in which the WCD is registered, and typically to one or more additional base stations for transmission in one or more adjacent zones (e.g., zones A and C) as well. If the second attempt also fails, then the MSC initiates a third attempt to page the WCD, which typically involves sending the page record to multiple base stations for a system-wide transmission of the page record (i.e., in all paging zones within the coverage area of the switch), although it is possible that a third attempt may be of a different scope as well. Furthermore, it should be understood that an exemplary embodiment may also be implemented in a RAN that does not implement zone-based paging, without departing from the scope of the invention.

B. Adaptive Paging

In an exemplary embodiment, a RAN may additionally or alternatively implement an adaptive paging scheme. With adaptive paging, the RAN makes an initial page attempt to a WCD in one or more coverage areas (e.g., in one or more sectors) where it believes that the page to the WCD is likely to succeed, before implementing a more general paging strategy.

For instance, referring to FIG. 2, when MSC 52 receives an incoming communication for WCD 108, MSC 52 may make an initial page attempt in certain sectors where it believes that the page to WCD 108 is likely to succeed. Note that the sectors in which an initial page attempt is made may or may not be in the same zone. For example, if the user of WCD 108 works in a sector in Zone A, which is served by BTS 14, and the user's home is in a sector in Zone C, which is served by BTS 28, then both these sectors may be included in the initial page attempt. Further, if the initial page attempt is unsuccessful, then MSC may resort to a general paging strategy such as zone-based paging.

In an exemplary embodiment, a RAN may use a recent-response list for a given WCD to implement adaptive paging, and in particular, to determine which sectors to include in the initial page attempt to the WCD. The recent-response list for a particular WCD may include coverage areas via which a page response message was recently received from the particular WCD; e.g., the coverage areas in which the WCD was located when it sent recent page response messages that were successfully received by the RAN. Further, in an exemplary embodiment, the recent-response list for a particular WCD may indicate, for each coverage area: (i) the PSR for the particular WCD in that coverage area and (ii) the PCO in the coverage area.

As such, the RAN (e.g., one or more MSCs) may create and dynamically maintain recent-response lists on a per-WCD basis (possibly for both home and roaming) in order to track PSR for individual WCDs on a per-sector basis, as well as the PCOs in coverage areas where the WCD has recently operated. Accordingly, the recent-response list for a given WCD may include a data entry for coverage areas via which the RAN has received a page response message from the WCD (or more simply, for coverage areas in which the RAN has attempted to page the WCD). Further, the recent-response list may include data entries for coverage areas in which the RAN has attempted to page the WCD, and may rank the coverage areas based, at least in part, on the recency of the last page response message that was received from the WCD in each coverage area.

In some embodiments, the total number of coverage areas on the recent-response list for a given WCD may be capped. For example, the recent-response list may include up to a predetermined number of the most-recent coverage areas via which a page response message was received from the particular WCD. For instance, the RAN could be configured to include the five most-recent coverage areas in which the particular WCD sent a page response message to the RAN. (Note that in this example, if page response messages have not been received from the WCD in at least five different coverage areas, then the recent-response list may include less than five coverage areas.)

Further, in some embodiments, the recent-response list may include up to a predetermined number of the most-recent coverage areas via which a page response message was received, within a certain time frame. For instance, the RAN could be configured to include up to four of the most-recent coverage areas in which the particular WCD sent a page response message in the last twenty-four hours.

In other embodiments, the RAN might not place a limit on the number of coverage areas that can be included on the recent-response list. However, in this configuration, the RAN might still limit the time frame covered by the recent-response list. For instance, the recent-response list for a given WCD might include all coverage areas via which the RAN received a page response message from the WCD in the past week. Other examples and variations on the above examples of recent-response lists are possible as well.

Figure 3:
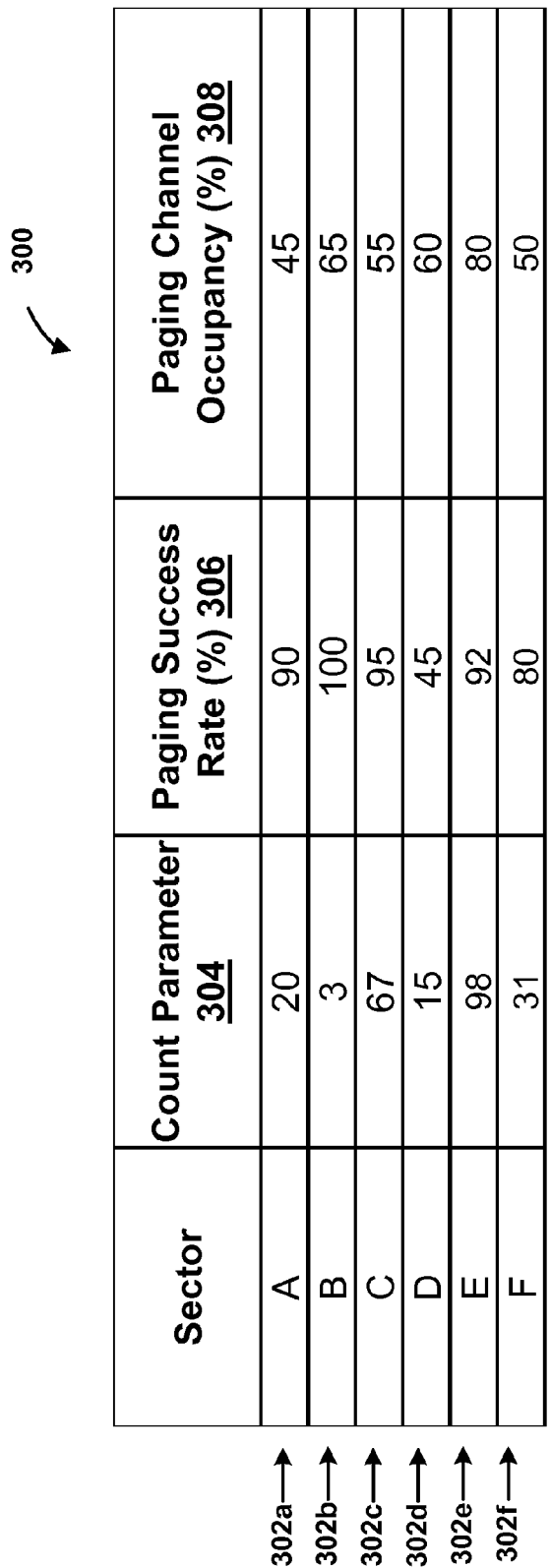
FIG. 3 is a table illustrating a recent-response list for a WCD, according to an exemplary embodiment.

FIG. 3 is a table illustrating a recent-response list 300 for a WCD, according to an exemplary embodiment. An recent-response list, such as recent-response list 300, may be maintained at one or more MSCs in a RAN, or may be maintained at another data-storage location within or accessible to one or more components of a RAN.

As shown, recent-response list 300 includes data entries for six sectors A to F. In the illustrated example, sectors A to F may be listed in the order shown, from top to bottom, based on the recency with which a page response message was received from the WCD in each sector A to F. More specifically, sector A may be listed first because the most-recent page response message from the WCD was received via sector A, sector B may be listed second because the second-most-recent page response message from the WCD was received via sector B, and so on. Alternatively, the order of sectors on recent-response list 300 may not have any particular meaning.

Further, in an exemplary embodiment, the data entry for a given coverage area may include: (a) a count parameter, (b) an indication of the paging-success rate for the given coverage area, and (c) an indication of the paging-channel occupancy for the given coverage area. Further, the count parameter may indicate the number of page attempts in the coverage area over which the indicated PSR has been calculated. For example, as shown in FIG. 3, the respective data entries 302a to 302f for sectors A to F each include a value for a count parameter 304, an indication of a paging success rate (PSR) 306 for pages to the particular WCD in the sector, and a paging channel occupancy (PCO) 308 in the sector.

It should be understood that recent-response list 300 is provided for illustrative purposes, and is not intended to be limiting. In particular, recent-response list 300 provides a snapshot of a recent-response list at a given point in time, and because the recent-response list is dynamically updated, it will likely change over time. Further, a recent-response list may include more or less information, and take other forms, without departing from the scope of the invention.

III. RAN COMPONENT EMBODIMENT

Figure 4:
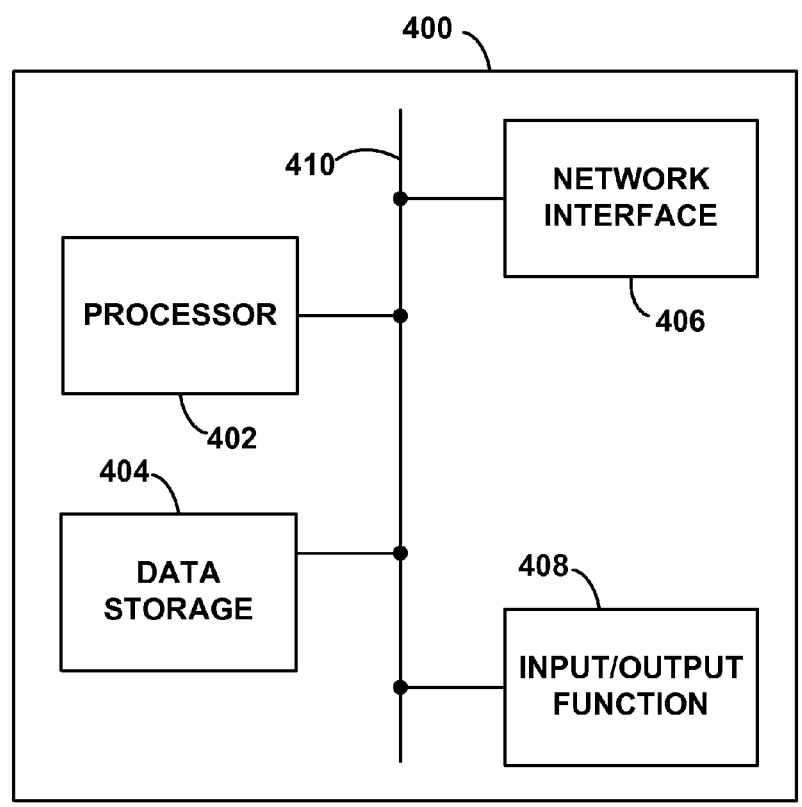
FIG. 4 is a simplified block diagram exemplifying a RAN component 400, and illustrating some of the functional components that would likely be found in a RAN component arranged to operate in accordance with the embodiments herein.

FIG. 4 is a simplified block diagram exemplifying a RAN component 400, and illustrating some of the functional components that would likely be found in a RAN component arranged to operate in accordance with the embodiments herein. Preferably, in an exemplary embodiment, RAN component 400 is a switch, such as an MSC. However, an exemplary RAN component 400 may also be another type of RAN component, or another type of device or system found in or associated with a RAN, such as a BTS, a BSC, and/or an MSC.

Example RAN component 400 preferably includes a processor 402, a data storage 404, a network interface 406, and an input/output function 408, all of which may be coupled together by a system bus 410 or a similar mechanism. Processor 402 preferably includes one or more CPUs, such as one or more general purpose processors and/or one or more dedicated processors (e.g., application specific integrated circuits (ASICs) or digital signal processors (DSPs), etc.)

Data storage 404, in turn, may comprise volatile and/or non-volatile memory and can be integrated in whole or in part with processor 402. Data storage 404 preferably holds program instructions, executable by processor 402, and data that is manipulated by these instructions to carry out the various methods, processes, or functions described herein. Alternatively, these methods, processes, or functions can be defined by hardware, firmware, and/or any combination of hardware, firmware and software. By way of example, the data in data storage 404 may contain program instructions executable by processor 402 to carry out any of the methods, processes, or functions disclosed in this specification or the accompanying drawings.

Network interface 406 may take the form of a wireline connection, such as an Ethernet, Token Ring, or T-carrier connection. Network interface 406 may also take the form of a wireless connection, such as IEEE 802.11 (WiFi), BLUETOOTH®, or a wide-area wireless connection. However, other forms of physical layer connections and other types of standard or proprietary communication protocols may be used over network interface 406. Furthermore, network interface 406 may comprise multiple physical interfaces.

Input/output function 408 may facilitate user interaction with example RAN component 400. Input/output function 408 may comprise multiple types of input devices, such as a keyboard, a mouse, a touch screen, and so on. Similarly, input/output function 408 may comprise multiple types of output devices, such as a monitor, printer, or one or more light emitting diodes (LEDs). Additionally or alternatively, example RAN component 400 may support remote access from another device, via network interface 406 or via another interface (not shown), such an RS-232 or USB port.

Further, an exemplary system, such as RAN component 400 of FIG. 4, preferably takes the form of a switch in an access network, such as an MSC. However, an exemplary system may also take the form of and/or include other RAN components.

An exemplary RAN component 400 or a combination of such RAN components may be further configured to create and/or maintain recent-response lists for WCDs. In an exemplary embodiment, a RAN component 400 a separate recent-response list may be created for each WCD that operates in the RAN.

Further, according to an exemplary embodiment, a switch may include data storage having program instructions stored thereon that are executable to initiate the switch functionality described herein. For example, an exemplary system may include program instructions stored on a tangible computer-readable medium that are executable to carry out the various RAN functionality described herein.

IV. EXEMPLARY METHODS

Exemplary methods may be implemented by a RAN component, such as a switch, to help implement an adaptive paging scheme, and more specifically, to help select one or more coverage areas for an initial page attempt.

Figure 5A:
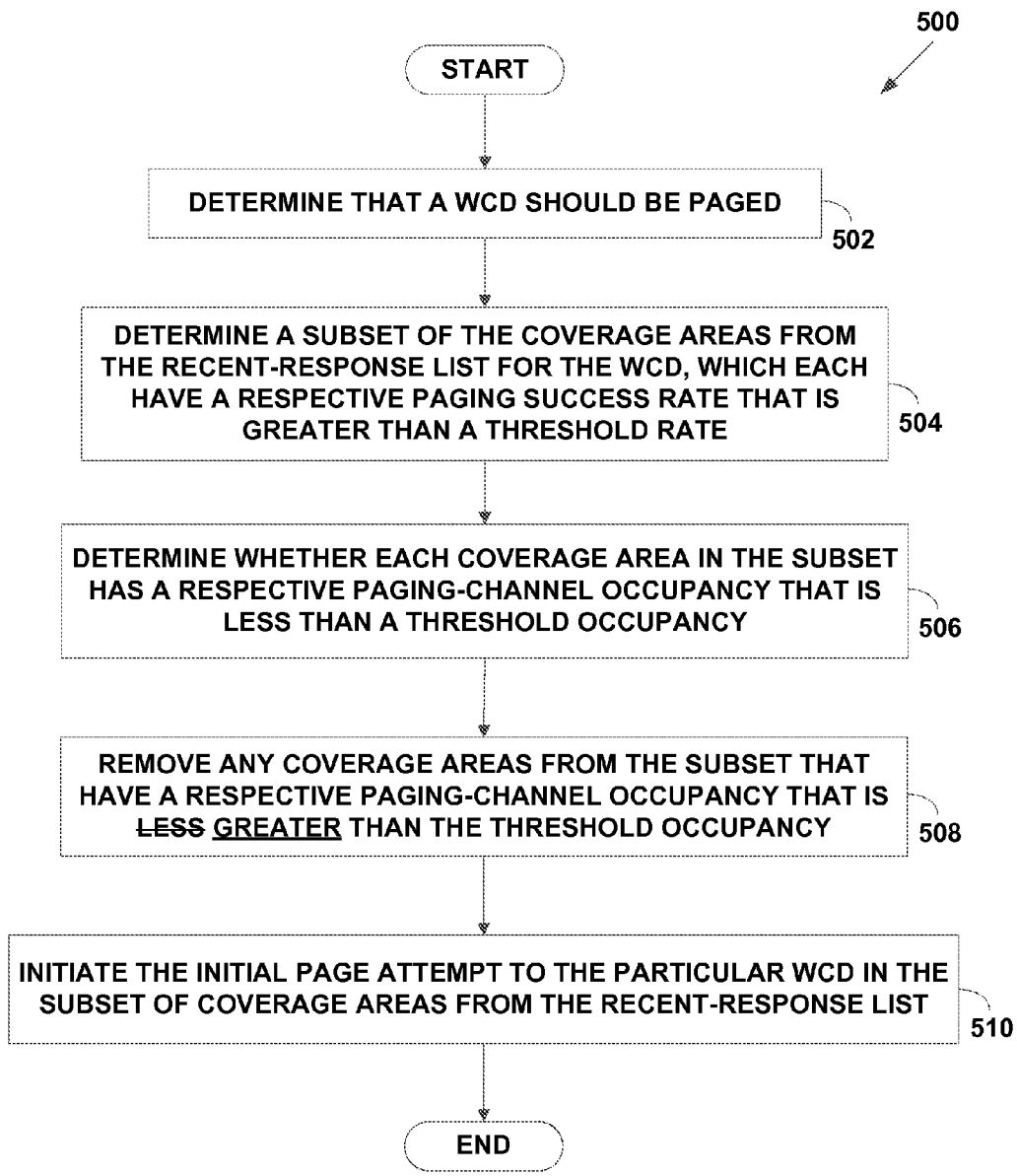
FIG. 5A is a flow chart illustrating a method 500, according to an exemplary embodiment.

FIG. 5A is a flow chart illustrating a method 500, according to an exemplary embodiment. Method 500 and other exemplary methods may be described herein by way of example as being carried out by a switch in a RAN. However, it should be understood that an exemplary method or portions thereof may be carried out by other RAN components and/or a combination of RAN components, without departing from the scope of the invention.

As shown by block 502, method 500 involves a switch determining that a WCD should be paged. In response to determining that the WCD should be paged, the switch selects one or more coverage areas for an initial page attempt to the particular WCD. More specifically, to select the coverage areas to include in the initial page attempt, the switch may determine a subset of the coverage areas from the recent-response list for the WCD, with each selected coverage area having a respective paging success rate that is greater than a threshold rate, as shown by block 504. In an exemplary embodiment, the recent-response list may include coverage areas via which a page response message was recently received from the particular WCD. The WCD may then determine whether each coverage area in the subset has a respective paging-channel occupancy that is less than a threshold occupancy, as shown by block 506. The WCD can then remove from the subset any coverage area(s) which have a respective paging-channel occupancy that is greater than the threshold occupancy, as shown by block 508. Then, after removing any coverage areas having greater than the threshold occupancy, the WCD may initiate the initial page attempt to the particular WCD in the subset of coverage areas from the recent-response list, as shown by block 510.

Figure 5B:
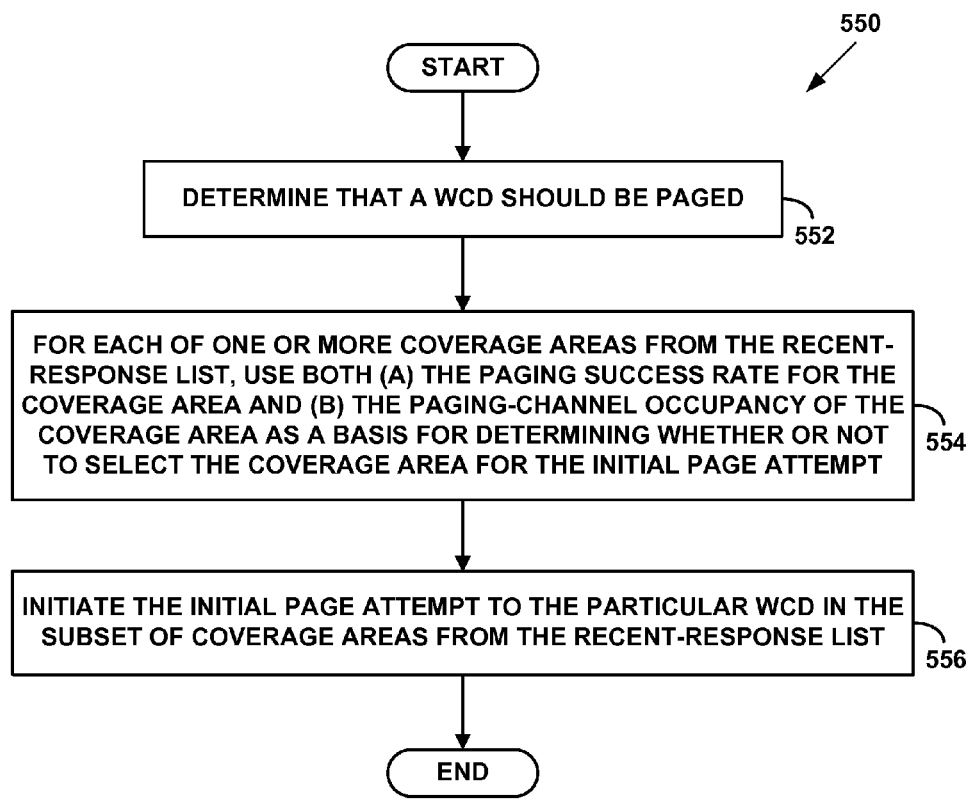
FIG. 5B is a flow chart illustrating another method 550, according to an exemplary embodiment.

FIG. 5B is a flow chart illustrating another method 550, according to an exemplary embodiment. More specifically, method 550 involves a switch determining that a WCD should be paged, as shown by block 552. In response to determining that the WCD should be paged, the switch selects one or more coverage areas from a recent-response list, for inclusion in an initial page attempt to the particular WCD. More specifically, for each of one or more coverage areas from the recent-response list, the WCD may use both (a) the paging success rate for the coverage area and (b) the paging-channel occupancy of the coverage area, as a basis for determining whether or not to select the coverage area for the initial page attempt, as shown by block 554. The WCD may then initiate the initial page attempt to the particular WCD in the subset of coverage areas from the recent-response list, as shown by block 556.

In a further aspect of an exemplary method 500 and/or exemplary method 550, if the initial page attempt fails (e.g., if no page response message is received within a certain period of time), then the RAN may resort to another paging strategy, such as zone-based paging. Alternatively, up to two or more page attempts could be made in the coverage areas selected at block 554, before resorting to another paging strategy. Other variations are possible A. Selecting Coverage Areas for the Initial Page Attempt As noted above, an exemplary method 550 may involve the RAN selecting coverage areas from the recent-response list, for an initial page attempt. In particular, for a given coverage area from the recent-response list, the RAN may use both (a) the paging success rate and (b) the paging-channel occupancy, as indicated by the recent-response list entry for the given coverage area, as a basis for determining whether or not to select the coverage area for the initial page attempt.

In some embodiments, block 554 of method 550 may involve the RAN determining, for each of one or more of the coverage areas from the recent-response list: (a) whether the paging success rate for the coverage area is greater than a threshold rate, and (b) whether the paging-channel occupancy for the coverage area is less than a threshold occupancy. The RAN may then select those coverage areas for which both (a) the paging success rate is greater than the threshold rate and (b) the paging-channel occupancy is less than the threshold occupancy. Other examples are possible as well.

Further, in some embodiments, the RAN may attempt to send the initial page attempt in a predetermined "target" number of coverage areas, without thresholding the occupancy level and/or without thresholding the paging success rate. As such, the RAN may score some or all of the coverage areas from a WCD's recent-response list based on the respective PSR and PCO of each coverage area. For instance, a coverage area's score may be calculated such that a higher PSR results in a higher score, and vice versa. Further, a lower PCO may increase a coverage area's score, and vice versa. The coverage areas may then be ranked according to their scores, and the target number of the highest-scoring coverage areas may be selected for the initial page attempt.

As a specific example, consider a scenario where the target number is three, and the score for a given coverage is set is calculated as:

$$score = PSR + (100 - PCO)$$

In this scenario, if recent-response list 300 of FIG. 3 represents the current recent-response list for a WCD, then the scores for sectors A to F can be determined to be 145, 135, 140, 85, 112, and 130, respectively. Accordingly, because sectors A, B, and C have the three highest scores from the sectors on the WCD's recent-response list, an initial page attempt may be made in sectors A, B, and C. Many other examples are possible as well. Further, variations to the above technique and/or other techniques for scoring coverage areas are also possible.

In yet other embodiments, at block 554, the RAN may cap the number of coverage areas for an initial page attempt to a predetermined maximum number, while still applying the threshold occupancy and the threshold paging success rate in the selection process. In such an embodiment, when more than the maximum number of coverage areas qualify for selection by, e.g., having both (a) a respective PSR that is above the threshold rate and (b) a respective PCO that is below the threshold occupancy, the RAN may select up to the maximum number of coverage areas from the larger group of qualifying coverage areas.

When more coverage areas than the maximum number qualify for the initial page attempt, the RAN may use various techniques to select which qualifying coverage areas to include. For example, the qualifying coverage areas may be scored and ranked in a manner such as described above (e.g., based on their respective PSRs and PCOs). The RAN can then select the highest ranking of the qualifying coverage areas. Other techniques are also possible.

B. Using the Count Parameter as a Further Basis to Select Coverage Areas for the Initial Page Attempt In some embodiments, the RAN may also utilize the count parameter as a further basis for selecting coverage areas from the recent-response list, for the initial page attempt. In particular, the RAN may remove coverage areas having less than a threshold count from consideration. For example, consider a scenario where the threshold count to qualify a coverage area for an initial page attempt is five page attempts. In this scenario, if recent-response list 300 of FIG. 3 is the current recent-response list for a WCD, then sector B may be disqualified from consideration.

For example, consider a modification to the scenario above, in which sectors A, B, and C were selected because they had the three-highest scores, to require a threshold count of five. In this modified scenario, sector B, which otherwise had one of the three highest scores, would not be selected because its count of three is less than the threshold. Instead, the RAN would select sectors A, C, and F. Many other examples, with the same or different threshold counts, are also possible.

C. Maintaining the Recent-Response List

In a further aspect, an exemplary method may involve a RAN component or components (e.g., one or more switches), maintaining a recent-response list for each of one or more WCDs. To do so, the RAN component may create a recent-response list for a particular WCD, and periodically update the recent-response list such that the recent-response list includes a number of the most-recent coverage areas via which a page response message was received from the particular WCD.

Figure 6:
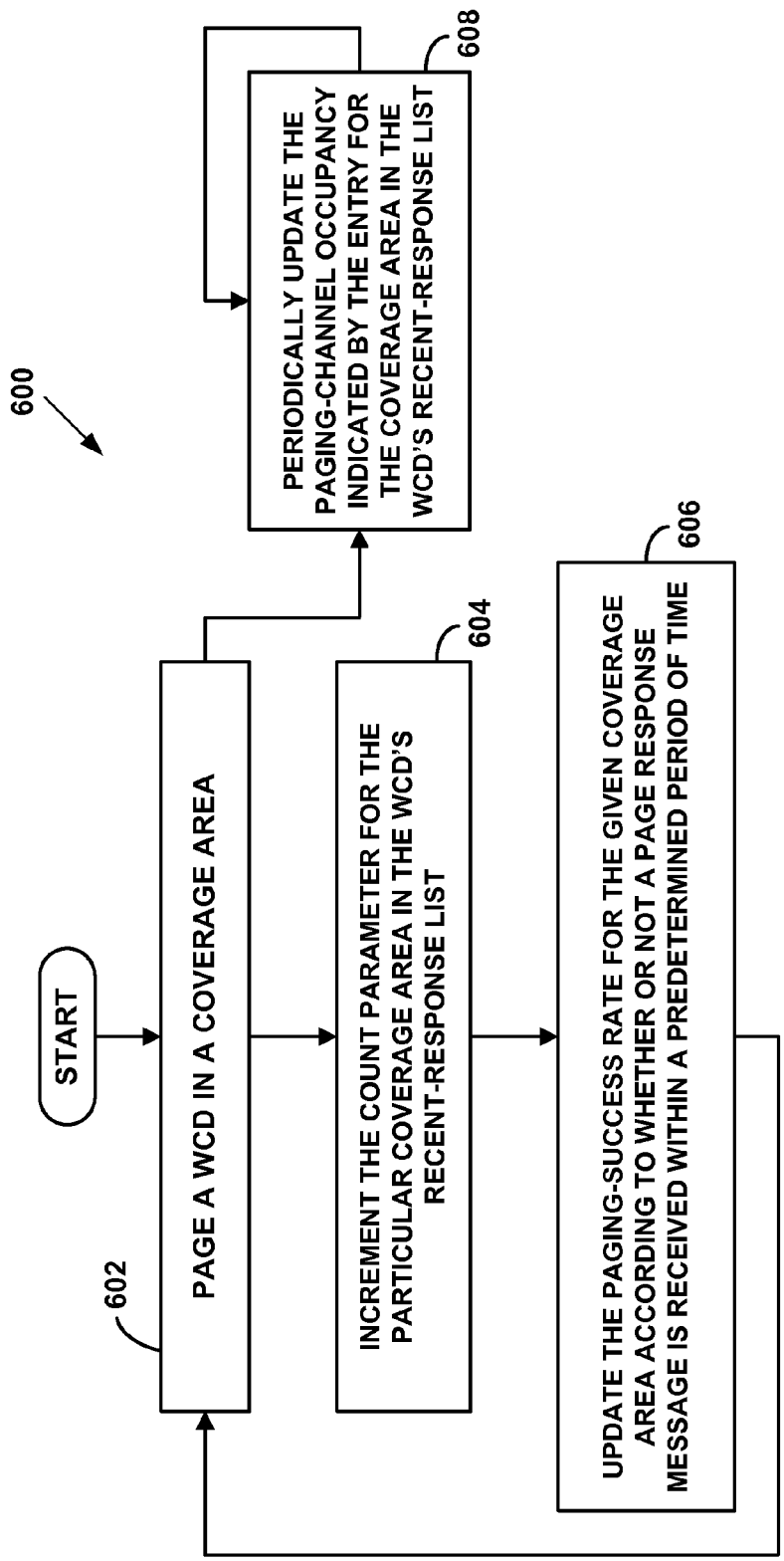
FIG. 6 is a flow chart illustrating a method 600 for maintaining a recent-response list, according to an exemplary embodiment.

For example, FIG. 6 is a flow chart illustrating a method 600 for maintaining a recent-response list, according to an exemplary embodiment. In particular, each time a WCD is paged in a particular coverage area, as shown at block 602, the RAN may responsively increment the count parameter for the particular coverage area in the WCD's recent-response list, as shown by block 604. Furthermore, after each page attempt to the particular WCD via the given coverage area, the RAN may update the paging-success rate for the given coverage area according to whether or not a page response message is received within a predetermined period of time, as shown by block 606. Further, as shown by block 608, the RAN may periodically or from time-to-time update the paging-channel occupancy indicated by an entry for a coverage area, so that the entry reflects a more current paging-channel occupancy.

In an exemplary embodiment, a page may be considered a success, for purposes of calculating the paging-success rate in a coverage area, when a page response is received on any attempt. For example, when a page response is received via a particular coverage area, thus may be considered a success, for purposes of the paging-success rate, regardless of whether the response was received after the initial page attempt, after a first page attempt in a subsequent zone-based paging process, after a second attempt in the zone-based paging process, or after a third attempt in the zone-based paging process. In other embodiments, it is possible that the page-success rate may be calculated in a different manner.

Note also that in some embodiments, the recent-response list may only take into account page attempts made during a predetermined window of time (e.g., the last day, the last week, or the last month), when determining the PSR for a coverage area. Accordingly, when a page attempt that was factored into the calculation of the PSR becomes older and falls outside this window, such that it is no longer considered when determining the PSR, the count parameter may be decreased to reflect that this page attempt is no longer being considered.

In a further aspect, there may be scenarios where no recent-response list entry exists for a coverage area in which a mobile is being paged. Thus, at or near the time when a page is sent to the WCD, (e.g., at or near the time of block 502 or block 552 of methods 500 and 550, respectively), the RAN may determine whether the recent-response list for the WCD includes an entry for the coverage area(s) in which the WCD is being paged. Accordingly, if the recent-response list for the particular WCD does not already include an entry for the particular coverage area, then the RAN may create an entry for the particular coverage area. Further, when an entry is created for a given coverage area, the RAN may (a) increment the count parameter for the entry (e.g., by setting the count parameter equal to one) and/or (b) determine the paging-channel occupancy for the given coverage area and update the entry to indicate the determined paging channel occupancy.

D. Additional Adjustments to Paging Based on the Paging Channel Occupancy

In some embodiments, the RAN may further adjust paging scheme settings for an initial page attempt to a particular WCD (e.g., for adaptive paging) and/or may adjust paging scheme settings for any subsequent attempts (e.g., during zone-based paging), based on the paging channel occupancies indicated in the recent-response list for the WCD. For instance, an exemplary method, such as method 500 or 550, may further involve the RAN using the paging-channel occupancy in at least one coverage area that is selected for the initial page attempt as a basis for adjusting at least one paging-scheme setting affecting attempts to page the WCD in the selected coverage area.

In such an embodiment, various paging-scheme settings may be adjusted. For example, the RAN may adjust: (a) at least one setting for zone-based paging, (b) a maximum attempt parameter, (c) a duration of a page-attempt timer, and/or (d) a power-level for the initial page attempt, among other possibilities.

A switch may use a variety of techniques, based on the combination of the WCD performance indicator and the coverage-area performance indicator, to set one or more paging-scheme settings. Generally, paging-scheme settings may be adjusted so as to increase the likelihood of success for a page to a WCD in an area with a lower paging-channel occupancy, and possibly vice versa.

For example, the switch may increase the number of initial attempts that can be made in some or all of the selected areas, before initiating, e.g., zone-based paging, when it determines that the PCO is below a threshold level in some or all of the selected areas. As another example, the RAN may increase the power-level for an initial page attempt and/or subsequent page attempts in a selected area where the PCO is below a threshold level. Note that the threshold occupancy level that is used to further adjust other paging-scheme settings may be the same as or different from any threshold occupancy level that is applied to select the coverage areas for the initial page attempt. Many other examples and variations are possible.

In some of the above examples, the PCO in a selected area was compared to a threshold occupancy level, which thus allowed for paging-scheme settings to be adjusted in a binary manner. However, in some embodiments, the RAN may use the PCO to adjust paging-scheme settings in a more granular manner. Other examples are possible as well.

V. CONCLUSION

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

The invention claimed is:

1. A method comprising:
at a switch in a radio access network, making a determination that a particular wireless communication device (WCD) should be paged;
responsive to the determination that the particular WCD should be paged, selecting one or more coverage areas for an initial page attempt to the particular WCD, wherein selecting the one or more coverage areas comprises:
(i) determining a subset of the coverage areas from a recent-response list that includes coverage areas via which a page response message was recently received from the particular WCD, wherein each coverage area in the subset has a respective paging success rate that is greater than a threshold rate; and
(ii) for each coverage area in the subset: (a) determining whether a respective paging-channel occupancy of the coverage area is greater than a threshold occupancy and (b) removing the coverage area from the subset if the paging-channel occupancy of the coverage area is greater than the threshold occupancy; and
after removing any coverage areas having greater than the threshold occupancy, initiating the initial page attempt to the particular WCD in the subset of coverage areas.

2. The method of claim 1, wherein the recent-response list further comprises a count parameter for each included coverage area, and wherein selecting the one or more coverage areas for the initial page attempt to the particular WCD further comprises, for each of one or more coverage areas from the recent-response list, using the count parameter for the coverage area as a further basis for determining whether or not to select the coverage area for the initial page attempt.

3. A method comprising:
at a radio access network component, making a determination that a particular wireless communication device (WCD) should be paged;
in response to the determination that the particular WCD should be paged, selecting one or more coverage areas for an initial page attempt to the particular WCD, wherein the one or more selected coverage areas are selected from a recent-response list that indicates coverage areas via which a page response message was recently received from the particular WCD, and wherein selecting the one or more coverage areas comprises:
for each of one or more coverage areas from the recent-response list, using both (a) a paging success rate for the coverage area and (b) a paging-channel occupancy of the coverage area as a basis for determining whether or not to select the coverage area for the initial page attempt; and
initiating the initial page attempt to the particular WCD in the one or more selected coverage areas.

4. The method of claim 3, wherein the recent-response list further comprises a count parameter for each included coverage area, and wherein selecting the one or more coverage areas for the initial page attempt to the particular WCD further comprises, for each of one or more coverage areas from the recent-response list, using the count parameter for the coverage area as a further basis for determining whether or not to select the coverage area for the initial page attempt.

5. The method of claim 3, wherein using both (a) the paging success rate for the coverage area and (b) the paging-channel occupancy of the coverage area, as a basis for determining whether or not to select the coverage area for the initial page attempt comprises,
determining whether both (a) the paging success rate for the coverage area is greater than a threshold rate and (b) the paging-channel occupancy for the coverage area is less than a threshold occupancy; and
selecting the coverage area for the initial page attempt if the paging success rate is greater than the threshold rate and the paging-channel occupancy is less than the threshold occupancy.

6. The method of claim 3, further comprising maintaining the recent-response list for the particular WCD.

7. The method of claim 6, wherein maintaining the recent-response list for the particular WCD comprises periodically updating the recent-response list such that the recent-response list includes an entry for each of a plurality of the most-recent coverage areas via which a page response message was received from the particular WCD.

8. The method of claim 6, wherein the entry for each coverage area comprises a count parameter, and wherein maintaining the recent-response list for the particular WCD comprises:

when a page is sent to the particular WCD via a given coverage area, incrementing the count parameter in the entry for the particular coverage area.

9. The method of claim 6, wherein the entry for each coverage area comprises an indication of the paging-success rate for the given coverage area, and wherein maintaining the recent-response list for the particular WCD comprises:
 after a page is sent to the particular WCD via a given coverage area, updating the paging-success rate for the given coverage area according to whether or not a page response message is received within a predetermined period of time.

10. The method of claim 6, wherein the entry for each coverage area comprises an indication of the paging-channel occupancy for the given coverage area, and wherein maintaining the recent-response list for the particular WCD comprises periodically or from time-to-time:
 determining an updated paging-channel occupancy for a given coverage area from the recent-response list; and
 updating the entry for the given coverage area to indicate the updated paging channel occupancy.

11. The method of claim 6, wherein the entry for each coverage area comprises (a) a count parameter, (b) an indication of the paging-success rate for the given coverage area, and (c) an indication of the paging-channel occupancy for the given coverage area, and wherein maintaining the recent-response list for the particular WCD comprises:
 each time a page is sent to the particular WCD via a given coverage area, incrementing the count parameter in the entry for the particular coverage area;
 after each page is sent to the particular WCD via the given coverage area, updating the paging-success rate for the given coverage area according to whether or not a page response message is received in response to the page is received within a predetermined period of time; and
 periodically or from time-to-time: (a) determining an updated paging-channel occupancy for a given coverage area from the recent-response list and (b) updating the entry for the given coverage area to indicate the updated paging channel occupancy.

12. The method of claim 6, wherein maintaining the recent-response list comprises ranking the included coverage areas based at least in part on the recency of the page response message received from the WCD via each respective coverage area.

13. The method of claim 3, wherein determining whether or not to select a coverage area from the recent-response list for the initial page attempt comprises:
 determining a score for the coverage area, wherein the score is based on both the paging success rate for the coverage area and the paging-channel occupancy of the coverage area; and
 based on a comparison of the score to a threshold score, determining whether or not to select the coverage area for the initial page attempt.

14. The method of claim 3, wherein determining whether or not to select each of the one or more coverage areas from the recent-response list for the initial page attempt comprises:
 determining a score for each coverage area, wherein the score for each coverage area is based on both the paging success rate for the coverage area and the paging-channel occupancy of the coverage area; and
 selecting a predetermined number of the highest-scoring coverage areas from the recent-response list.

15. The method of claim 3, further comprising, for at least one coverage area that is selected for the initial page attempt:
 using the paging-channel occupancy as a basis for adjusting at least one paging-scheme setting affecting attempts to page the WCD.

16. The method of claim 15, wherein adjusting at least one paging-scheme setting affecting attempts to page the WCD comprises adjusting a maximum attempt parameter for the initial page attempt.

17. The method of claim 15, wherein adjusting at least one paging-scheme setting affecting attempts to page the WCD comprises setting a duration of a page-attempt timer.

18. The method of claim 14, wherein adjusting at least one paging-scheme setting affecting attempts to page the WCD comprises setting a power-level for the initial page attempt.

19. A system comprising:
 a non-transitory computer-readable medium; and
 program instructions stored on the non-transitory computer-readable medium and executable by at least one processor to:
  make a determination that a particular wireless communication device (WCD) should be paged;
  in response to the determination that the particular WCD should be paged, select one or more coverage areas for an initial page attempt to the particular WCD, wherein the one or more selected coverage areas are selected from a recent-response list that indicates coverage areas via which a page response message was recently received from the particular WCD, and wherein selecting the one or more coverage areas comprises, for each of one or more coverage areas from the recent-response list, using both (a) a paging success rate for the coverage area and (b) a paging-channel occupancy of the coverage area as a basis to determine whether or not to select the coverage area for the initial page attempt; and
  initiate the initial page attempt to the particular WCD in the one or more selected coverage areas.

20. The system of claim 19, wherein the recent-response list further comprises a count parameter for each selected coverage area, the system further comprising program instructions stored on the non-transitory computer-readable medium and executable by at least one processor to use the count parameter for each of one or more coverage areas from the recent-response list as a further basis to determine whether or not to select the coverage area for the initial page attempt.

* * * * *